United States Patent [19]

Walker et al.

[11] Patent Number: 4,950,841
[45] Date of Patent: Aug. 21, 1990

[54] THERMALLY EFFICIENT SPLICE JOINT FOR ELECTRICAL DISTRIBUTION BUSWAY

[75] Inventors: Clarence W. Walker, Selmer, Tenn.; David A. Hibbert, South Windsor, Conn.

[73] Assignee: General Electric Company, New York, N.Y.

[21] Appl. No.: 376,128

[22] Filed: May 30, 1989

[51] Int. Cl.⁵ .......................................... H01R 13/20
[52] U.S. Cl. .................. 174/88 B; 174/16.2; 174/68.2; 439/210; 439/212; 439/213
[58] Field of Search .................. 174/16.2, 68 B, 88 B; 439/210, 212, 213

[56] References Cited

U.S. PATENT DOCUMENTS

| | | | |
|---|---|---|---|
| 3,104,276 | 9/1963 | Cataldo et al. | 174/88 B |
| 3,187,086 | 6/1965 | Moodie et al. | 174/68.2 |
| 3,365,537 | 1/1968 | Fehr, Jr. et al. | 174/88 B |
| 3,559,148 | 1/1971 | Hafer | 439/213 |
| 4,627,680 | 12/1986 | Weimer et al. | 439/210 |
| 4,705,334 | 11/1987 | Slicer et al. | 439/210 |
| 4,804,804 | 2/1989 | Hibbert et al. | 174/16.2 |
| 4,849,581 | 7/1989 | Larkin et al. | 174/88 B |

OTHER PUBLICATIONS

Ser. No. 193,000 entitled "Thermally Efficient Splice Joint for Electrical Distribution Busway", filed 5/12/88, Beberman et al.
Ser. No. 194,655 entitled "Adjustable Joint for Electrical Busway", filed 5/16/88, Larkin et al.

*Primary Examiner*—Morris H. Nimmo
*Attorney, Agent, or Firm*—Richard A. Menelly; Walter C. Bernkopf; Fred Jacob

[57] ABSTRACT

An electric power bus removable joint includes three spacer-connectors that automatically align the intervening splice plates and insulative plates used to electrically connect between adjoining busway sections. The spacer-connectors automatically attach between the opposing joint face plates without requiring any additional fastening means.

19 Claims, 4 Drawing Sheets

THERMALLY EFFICIENT SPLICE JOINT FOR ELECTRICAL DISTRIBUTION BUSWAY

BACKGROUND OF THE INVENTION

Light-weight efficient current carrying electric bus bars are currently available for carrying large amounts of electric current with low heat loss generation. U.S. Pat. No. 4,804,804 describes one such busway system wherein the bus bars are insulatively bolted together to promote good thermal transport between the bus bars and the adjoining heat dissipative side plates. This Patent is incorporated herein for reference purposes and should be reviewed for a good description of the state of the art of thermally efficient power busway systems.

When adjoining busway sections are electrically interconnected in the field, an adjustable bus joint is employed. In order to preserve the excellent thermal properties of the insulatively bolted individual busway sections, a bus joint having electrically conductive splice plates and interleaving insulative plates held together by an insulative bolt is also required to reduce the amount of heat generated at the joint.

U.S. patent application Ser. No. 193,000 filed May 12, 1988 entitled "Thermally Efficient Splice Joints for Electrical Distribution Busway" and U.S. patent application Ser. No. 194,655 filed May 16, 1988 entitled "Adjustable Joint for Electrical Busway" both describe thermally efficient adjustable bus joints. The aforementioned U.S. patent applications are accordingly incorporated herein for purposes of reference.

U.S. Pat. No. 3,187,086 discloses a busway joint utilizing a single insulative bolt to interconnect between adjoining busway sections. U.S. Pat. No. 3,104,276 discloses a specific thru-bolt used with an adjustable bus joint. U.S. Pat. No. 3,365,537 discloses a removable bus joint having anti-turn properties. U.S. Pat. No. 4,705,334 describes a busway joint which includes an insulative thru-bolt and further includes a generally square shaped insulating tube to provide insulation between the thru-bolt and adjoining splice plates.

The splice plates described within aforementioned U.S. Pat. No. 3,365,537, for example, require three additional bolts to position and fasten the joint side plates together. In a high speed automated assembly process, it is difficult to insert and fasten the additional bolts without substantially reducing the overall bus joint manufacturing time.

One purpose of the instant invention is to provide means for automatically spacing the bus joint side plates and fastening the side plates during manufacture without requiring any auxiliary fastening means whatsoever.

SUMMARY OF THE INVENTION

An adjustable joint for electrical power busway includes spacer-connectors that extend between the opposing front and rear plates of the joint to accurately space the interleaved splice and insulating plates. Means are integrally-formed on the ends of the spacer-connectors for fastening the spacer-connectors to the front and rear plates without requiring any auxiliary fastening means. Projections integrally-formed on the front and rear plates cooperate with the spacer-connectors and with the insulating plates to provide means for electrical ground connection between a pair of adjacent power bus sections.

DESCRIPTION OF THE PREFERRED EMBODIMENT

Figure 1:
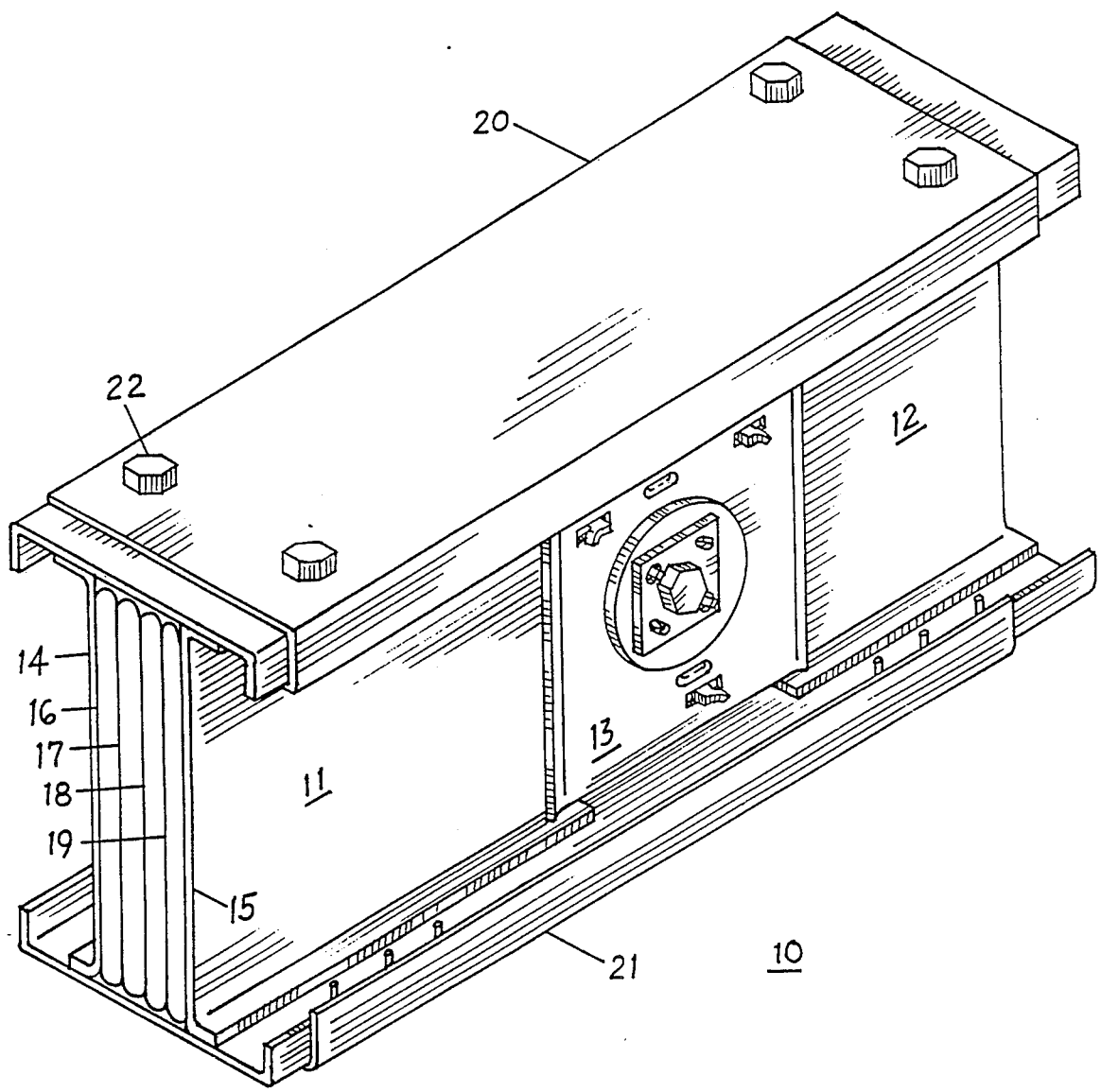
FIG. 1 is a top perspective view of a busway system including the adjustable bus joint according to the invention.

A busway system 10 shown in FIG. 1 comprises a pair of busway sections 11, 12 joined by a removable joint 13. Each busway section includes a pair of opposing side walls 14, 15 and bus conductors 16–19 which connect with the neutral and phase buses within an electrical distribution system. The bus joint includes a top and bottom plate 20, 21 which attach to the bus section by means of bolts 22.

Figure 2:
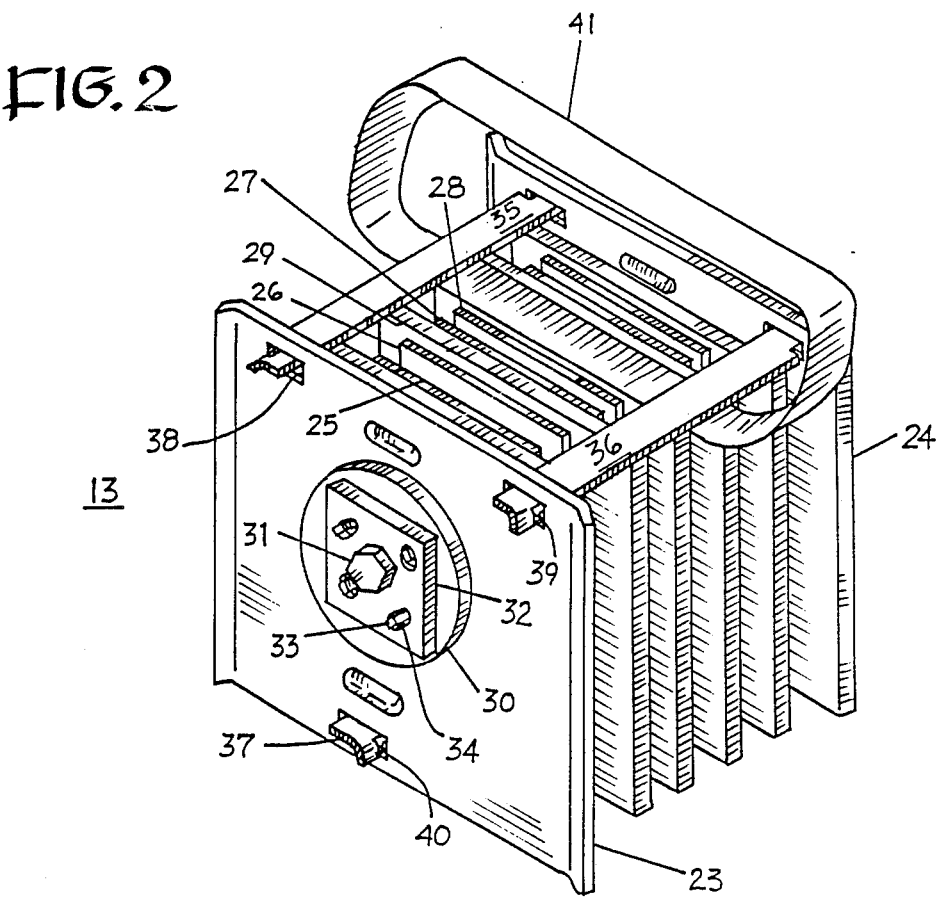
FIG. 2 is a top perspective view of the bus joint depicted in FIG. 1.

The light-weight and thermally efficient removable bus joint 13 is shown in FIG. 2 to comprise a pair of opposing front and rear plates 23, 24 with three or four pair of intervening metallic splice plates, one representative pair being designated 25, 26 and another pair designated 27, 28. The representative pairs of splice plates are electrically isolated by corresponding and intervening insulative plates, such as depicted at 29. The metallic splice plates and insulative plates are arranged between the front and rear plates and are all fastened together by means of an insulated bolt 31 extending through an anti-turn washer 32 and a Belville washer 30. The anti-turn plate includes four anti-turn lugs 33 which extend through corresponding slots 34 formed within the anti-turn washer. To multi-functionally connect the front and rear plates, provide accurate spacing between them and to provide anti-turn facility as well, three spacer-connectors 35–37 are arranged through three corresponding elongated slots 38–40 which are identically formed through both the front and rear plates although only the slots through the front plates and the top of the rear plate are shown in FIG. 2. To facilitate the insertion and removal of the joint, an endless strap 41 of nylon material is arranged about the top spacer-connectors 35 and 36.

Figure 3:
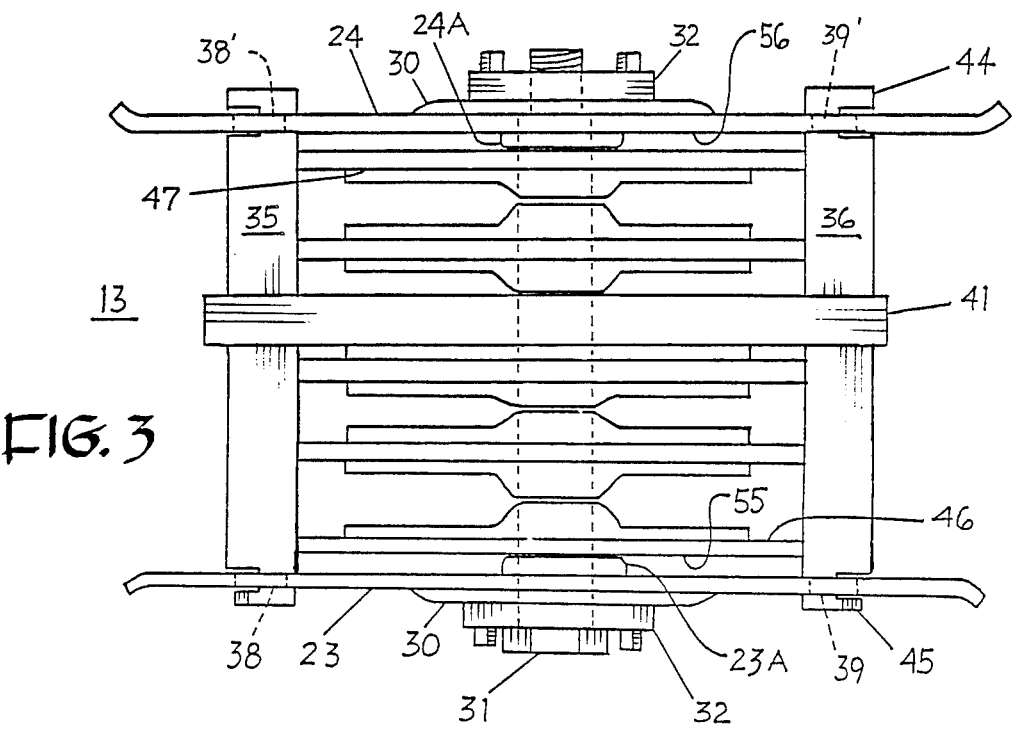
FIG. 3 is a top plan view of the bus joint of FIG. 2.

As best seen by referring to the adjustable disconnect joint 13 depicted in FIG. 3, the two top spacer-connectors 35, 36 provide accurate spacing between the front and rear plates 23, 24 by cooperation between the long tabs 44 formed at one end of the spacer-connectors and the short tabs 45 formed at an opposite end thereof as well as support the strap 41. The slots 38, 39 formed in the front plate 23 are smaller in width than the spacer connectors, 35, 36. The front and rear plates are identical in size and configuration, such that the slots 38', 39' in the rear plate 24 are identical to the slots 38, 39 in the front plate 23. A protrusion 23A is formed on the front plate and extends into abutment with the outermost insulative plate 46 on the front of the joint to thereby set and define a front ground connection slot 55 for receiving the side wall 15 of the busway section 11 depicted earlier in FIG. 1. A similar protrusion 24A is formed on the rear plate 24 to define a similar ground connection space 56 between the outermost insulative plate 47 on the back of the joint and the rear plate 24. This ground receiving space receives the opposite side plate 14 of the busway section 11 shown earlier in FIG. 1. Since the side walls of the busway sections are electrically connected with ground, electrical continuity between the busway sections 11, 12 is maintained by contact between the side walls of the adjoining busway sections 11, 12 with the front and rear plates 23, 24 of the joint when the side walls of the busway sections are received within the defined spaces 55, 56. The opposite end of the insulated bolt 31 is threadingly received in the internally threaded anti-turn washer 32 which is arranged against the rear plate 24 over the intermediate Belville washer 30.

Figure 4:
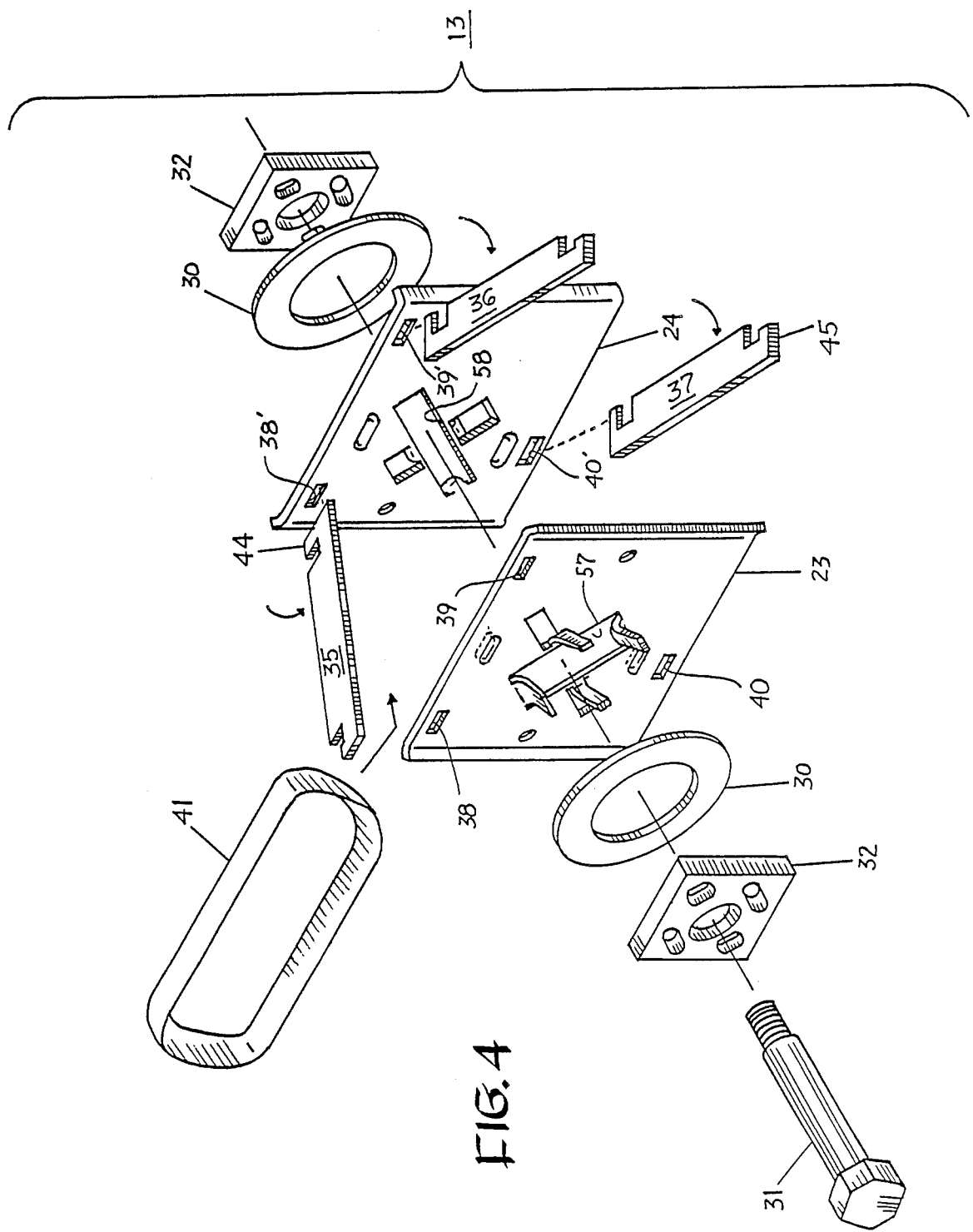
FIG. 4 is a top perspective view in isometric projection of the component parts used with the bus joints of FIG. 3.

The automated assembly between the components of the busway joint 13 is best seen by referring now to FIG. 4 wherein the metallic splice plates 25, 26 and 27, 28 shown earlier along with the interleaved insulative plates are omitted for purposes of clarity. The spacer-connectors 35-37 attach the front plate 23 to the rear plate 24 by hooking the long tabs 44 formed at one end of the spacer-connectors at an angle within the slots 38', 39', 40' in the rear plate 24 and rotating the spacer-connectors in the indicated direction to a position perpendicular to the rear plate. The handle 41 is arranged about the top two spacer-connectors 35, 36 and the short tabs 45 on all the spacers are then inserted within the corresponding slots 38, 39 and 40 in the front plate 23. The ends of the short tabs 45 are bent downwardly against the front plate to prevent the spacer-connectors from being removed therefrom. The insulated bolt 31 is next passed through the anti-turn washer 32, Belville washer 30 and thru-hole 57 formed in the front plate. The spacer-connectors 35-37 accurately space the metallic splice plates and insulative plates between the front and rear plates while providing anti-turn facility to the front and rear plates by means of the lateral configuration of the spacer-connectors and the corresponding lateral configuration of the elongated slots 38-40. By sizing the width of the spacer-connectors to be larger than the width of the elongated slots, only the short and long tabs 45, 44 pass through the slots whereas the remaining portion of the spacer-connectors abut against the inner surface of the front and rear plates to accurately set the distance therebetween. The joint is completed by passage of the insulated bolt 31 through the thru-hole 58 formed on the rear plate, Belville washer 30 and threadingly engaging the internally threaded anti-turn washer 32 to complete the assembly.

Figure 5:
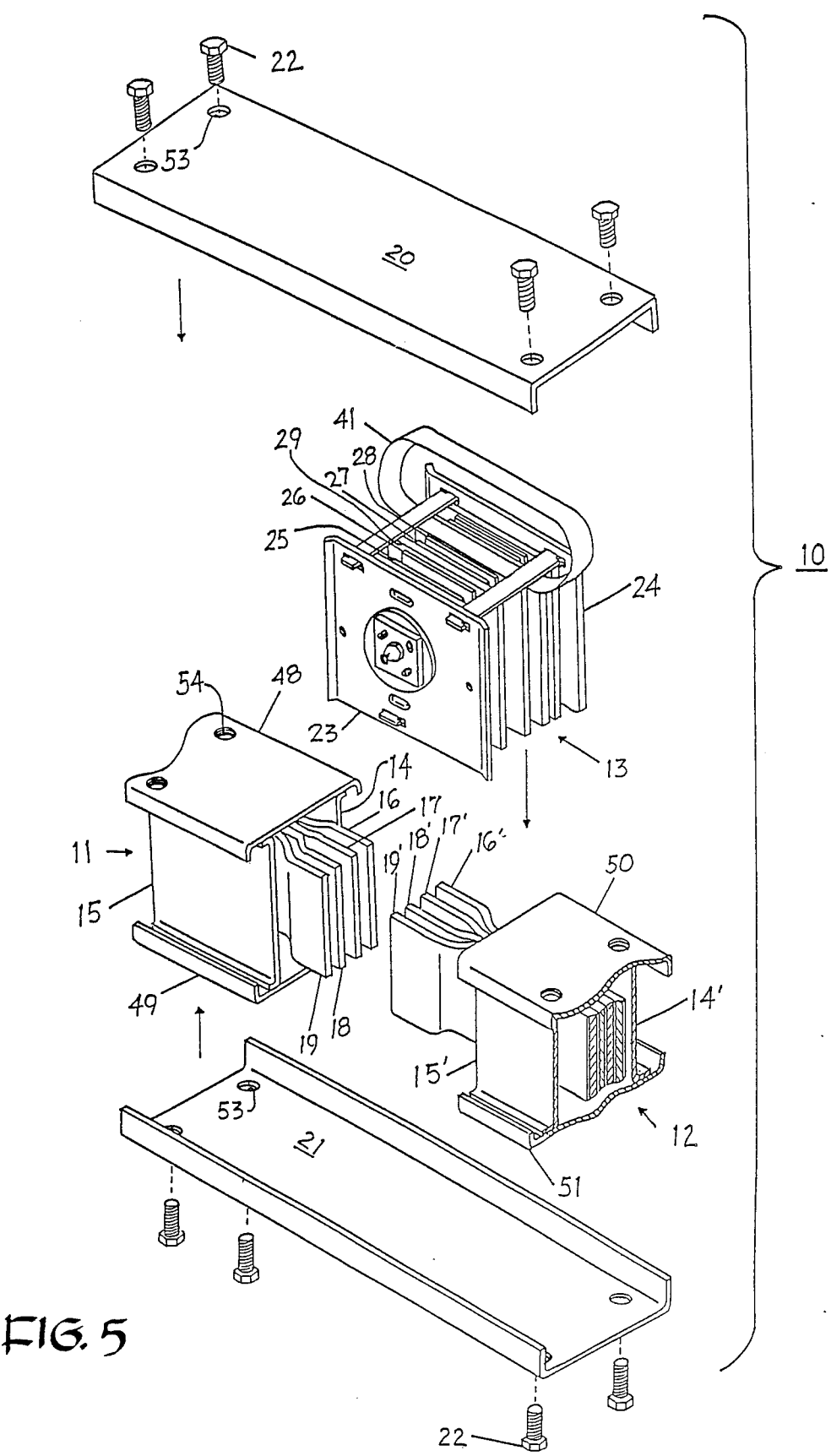
FIG. 5 is a top perspective view in isometric projection of the bus system depicted in FIG. 1.

The busway system 10 of FIG. 1 is assembled in the manner depicted in FIG. 5 by positioning the joint 13 between the two adjoining busway sections 11, 12 and, by means of the handle 41, trapping the corresponding bus bars 16-19 and 16'-19' between the adjoining metal splice plates 25, 26 and 27, 28 which are electrically isolated by means of the insulative plate 29. Ground connection between the two adjoining busway sections is made by contact between the side plate 15 on section 11, front plate 23 on the joint 13 and side plate 15' on section 12 as described earlier. In a similar manner, ground connection is made between the opposing side plate 14 on busway section 11, rear plate 24 on the joint 13 and opposing side plate 14' on busway section 12. The joint top plate 20 is attached to the top plate 48 on section 11 and to the top plate 50 on section 12 by means of bolts 22, thru-holes 53 and threaded openings 54. The bottom joint plate 21 is similarly attached to the bottom plate 49 of section 11 and the bottom plate 51 of section 12 by means of similar thru-holes 53 and bolts 22.

It has thus been shown that an adjustable bus joint having multi-functional anti-turn, spacing and attachment facility can be automatically assembled. The bus joint design allows interconnection with thermally efficient busway sections within a power busway system without increasing the thermal or electrical losses of the system.

Having thus described our invention, what we claim as new and desire to seek by Letters Patent is:

1. An electric power bus removable joint comprising:
   a pair of opposing apertured front and rear plates;
   a plurality of interleaved conductive splice plates and insulative isolation plated intermediate said front and rear plates;
   at least one spacer-connector means attached to said front and rear plates to fasten said front plates to said rear plates and to separate said front plates from said rear plates by a fixed separation distance; and
   an insulated thru-bolt extending through said front and rear plates, said splice plates and said isolation plates to thereby fasten said front and rear plates to said splice plates and said isolation plates.

2. The removable joint of claim 1 wherein said at least one spacer-connector means comprises a rectangular bar of predetermined length, width and thickness, said length defining said fixed separation distance intermediate said front and rear plates.

3. The removable joint of claim 2 including means arranged at opposing ends of said bar and a slot formed within said front and rear plates said means on said opposing ends of said bar cooperating with said slot to thereby fasten said front and rear plates together.

4. The removable joint of claim 3 wherein said slots comprise a width less than said width of said bar to stop said opposing ends against inner surfaces of said front and rear plates.

5. The removable joint of claim 3 wherein said means arranged at opposing ends of said bar comprises a first tab integrally-formed on one of said opposing ends and a second tab integrally-formed on another of said opposing ends.

6. The removable joint of claim 5 wherein said first tab is longer than said second tab.

7. The adjustable joint of claim 6 wherein said first tab comprises a first length and said second tab comprises a second length, said second length being longer than said first length.

8. The adjustable joint of claim 7 wherein said second length is equal to or greater than said width of said at least one spacer-connector.

9. The adjustable joint of claim 5 wherein said first tab extends through said slot-means in said front or rear plates.

10. The adjustable joint of claim 5 wherein said second tab extends through said slot means in said front or rear plates.

11. The adjustable joint of claim 9 wherein said first tab extends in a first plane parallel to said width of said at least one spacer-connector means.

12. The adjustable joint of claim 11 wherein an end of said first tab is bent at an angle to said first plane.

13. An electric power bus removable joint comprising:
   first and second opposing side plates;

a first slot through said first side plate and a second slot through said second side plate;

intervening metal splice plates and insulative means electrically isolating said splice plates arranged intermediate said first and second side plates;

an insulated thru-bolt extending through said splice plates, insulative means and said side plates; and at least one spacer-connector means fastening said first and second side plates together and separating said first and second side plates by a fixed separation distance extending between said first and second side plates, said at least one spacer-connector means terminating in a first tab at one end and said first tab being received in said first slot through said first side plate.

14. The joint of claim 13 wherein said at least one spacer-connector means comprises an elongated bar extending in a first plane, said first tab extending in said first plane perpendicular to said bar.

15. The joint of claim 13 including a second tab at an opposite end of said bar, said second tab being received in said second slot through said second side plate.

16. The joint of claim 13 wherein said bar comprises a rectangle of predetermined length, width and thickness, said width being greater than a width of said slot thereby causing said bar to abut against said first and second side plates.

17. The joint of claim 14 wherein said first and second tabs comprise a width less than said first and second slots width thereby causing said first and second tabs to transverse through said first and second slots.

18. The joint of claim 15 wherein said second tab comprises a width greater than said second slot to thereby allow a part of said second tab to initially pass through said second slot.

19. The joint of claim 18 wherein a part of said first and second tabs is formed against said one side frame to thereby prevent said at least one spacer-connector means from being removed from said first and second slots.

* * * * *

UNITED STATES PATENT AND TRADEMARK OFFICE
CERTIFICATE OF CORRECTION

PATENT NO. : 4,950,841

DATED : 8/21/90

INVENTOR(S) : Walker et al.

It is certified that error appears in the above-identified patent and that said Letters Patent is hereby corrected as shown below:

IN THE CLAIMS:

Claim 1, line 15, change "plated" to --plates--.

Claim 9, line 56, delete "means".

Claim 10, line 59, delete "means".

Signed and Sealed this

Twenty-ninth Day of October, 1991

Attest:

HARRY F. MANBECK, JR.

*Attesting Officer*     *Commissioner of Patents and Trademarks*